United States Patent
Liao

(10) Patent No.: US 7,492,359 B2
(45) Date of Patent: Feb. 17, 2009

(54) LINEAR COMPENSATION METHOD FOR TOUCH CONTROL SYSTEMS

(75) Inventor: Peter Liao, Zhongli (TW)

(73) Assignee: Danotech Co., Ltd., Taipei County, Banciao (TW)

( * ) Notice: Subject to any disclaimer, the term of this patent is extended or adjusted under 35 U.S.C. 154(b) by 662 days.

(21) Appl. No.: 11/305,924

(22) Filed: Dec. 19, 2005

(65) Prior Publication Data
US 2007/0139387 A1    Jun. 21, 2007

(51) Int. Cl.
*G06F 3/041* (2006.01)
(52) U.S. Cl. .................. 345/173; 178/18.02; 178/18.01
(58) Field of Classification Search .................. 345/173; 178/18.02
See application file for complete search history.

(56) References Cited

U.S. PATENT DOCUMENTS

| 5,283,559 | A * | 2/1994 | Kalendra et al. ............ 345/168 |
| 6,016,140 | A * | 1/2000 | Blouin et al. ............... 345/178 |
| 2002/0039094 | A1* | 4/2002 | Yamada et al. ............. 345/173 |
| 2003/0184527 | A1* | 10/2003 | Han ........................... 345/173 |
| 2004/0061687 | A1* | 4/2004 | Kent et al. .................. 345/173 |

* cited by examiner

Primary Examiner—Kent Chang
Assistant Examiner—Jonathan Boyd
(74) Attorney, Agent, or Firm—Frenkel & Associates P.C.

(57) ABSTRACT

A linear compensation method for touch control systems aims to provide an accurate correction for the depressing electric field that generates signal sources in a touch control system. Through a voltage detection and compensation approach, and after the touch control system has been shipped from the plant with correction done for a rated duty voltage or set duty voltage, and is installed on an operation environment and receives an actual duty voltage, the linear compensation method of the invention updates the linear compensation data according to the voltage variation between the actual duty voltage and the rated or set duty voltage thereby to maintain accurate depressing electric field at the duty voltage for the touch control system.

16 Claims, 3 Drawing Sheets

LINEAR COMPENSATION METHOD FOR TOUCH CONTROL SYSTEMS

FIELD OF THE INVENTION

The present invention relates to a linear compensation method for touch control systems and particularly to a linear compensation method to do accurate correction for depressing electric field while actual duty voltage is input to a touch control system.

BACKGROUND OF THE INVENTION

The technology for touch control panels generally can be categorized into several types, such as Film on Glass, capacitance, supersonic, optical (infrared light) and the like. In the global market of the touch control panels, Film on Glass has the greatest market share, about 60%. The capacitance type has about 24%, and is mostly for the high unit price market at the dimension of 10.4 inches or more, and is mainly used on information guide systems in public locations such as libraries, railway and bus stations, ATMs in banking, and the like. It has advantages such as water-proof, scrape resistant, higher light permeability and applicable in a wide range of temperature. However, it also has drawbacks such as requiring more manufacturing processes and complex driving IC and circuits. Hence it is not desirable for products of medium and small sizes in terms of cost and technology. The Film on Glass type mainly is used on consumer electronic products, such as self-service food ordering systems, PDAs, electronic dictionaries, mobile phones, stock and inventory management devices, POS accounting machines, credit card POS signature machines, medical monitor systems and the like. The Film on Glass type touch control panels also can be divided into digital type and analog type. The technology of the analog touch control panel further can be divided into 4-line, 5-line, 6-line and 8-line types. The technical principle of the touch control panel mainly bases on a screen touching by user's finger or other media to detect voltage, current, sound wave or infrared light according to different induction methods to identify the coordinates of the touching spot. For instance, the Film on Glass type uses the potential difference between an upper electrode and a lower electrode to detect the touch control point on the location of the pressing spot.

Whatever the type of the touch control panel, after the product is bonded with a glass baseboard and becomes a finished product, it has to go through a depressing electric field correction process through a touch control system. The purpose of the correction is to define a linear correction data table of an equal potential depressing curve of an applicable depressing electric field for the duty voltage of a selected installation site where operation the touch control system is to be performed. The definition is done by, first, preparing a linear correction database of a rated duty range voltage; after having determined the actual duty voltage of the touch control system on the operation site, comparing with the linear correction database to set the linear correction data table of the touch control system on the operation site.

However, after the touch control system has been installed on the actual operation site and connected to the actual duty voltage, the linear error of the touch control system could be undesirable. This phenomenon is more serious when the touch control panel is installed in an open space (especially in an outdoor environment). This is because the potential of the touch control system actually delivered by the transformed power supply on the operation site is not completely same as the duty voltage set at the shipment from the plant. A voltage variation is generated that affects the linearity accuracy. In addition, temperature, humidity and external interference also affect the potential and result in lower accuracy of the touch control system.

SUMMARY OF THE INVENTION

The primary object of the present invention is to solve the aforesaid disadvantages. The present invention provides a linear compensation correction mechanism on a touch control system. The linear compensation correction mechanism, via a voltage detection and compensation approach, updates linear compensation data according to voltage variation between the actual duty voltage and the rated duty voltage or set duty voltage after the touch control system has been shipped from the plant and the rated duty voltage or set duty voltage has been corrected, and has been installed on an actual operation environment and actual duty voltage is input. Thereby the touch control system can maintain desired depressing electric field accuracy at the actual duty voltage.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
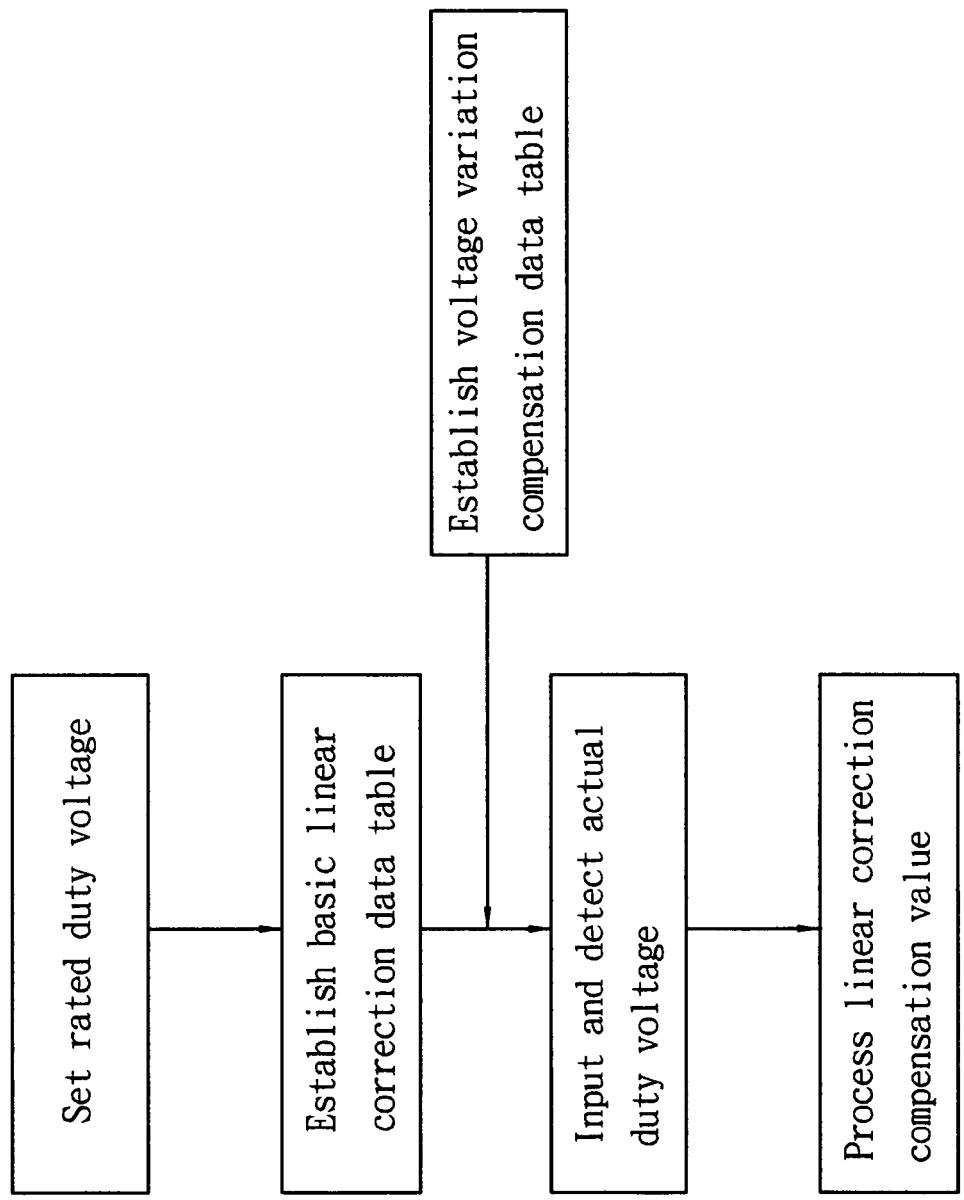
FIG. 1 is a flow chart of an embodiment of the linear compensation method of the present invention.

Please refer to FIG. 1 for the flow chart of an embodiment of the linear compensation method for touch control systems of the invention. The method includes the following steps:

Set rated duty voltage: Set a rated duty voltage for a touch control system before shipping from the plant. It is set according the potential of operation environment where the touch control system is to be installed.

Establish a basic linear correction data table: Define the rated duty voltage as the duty potential of the touch control system to establish a corresponding basic linear correction data table conforming to the rated duty voltage. The basic linear correction data table is the basic linear correction data table of a constant potential depressing curve of the depressing electric field of the touch control system.

Input and detect actual duty voltage: Input an actual duty voltage to the touch control system and detect and get voltage variation between the actual duty voltage and the rated duty voltage. In the event that the voltage variation between the actual duty voltage and the rated duty voltage is 0 or within an allowable error range, the touch control system takes the set basic linear correction data table as the constant potential depressing curve of the depressing electric field; in the event that voltage variation is greater than 0 or exceeds the allowable error range, enter the next step.

Process a linear correction compensation value: Get a linear correction compensation value corresponding to the voltage variation, and reflect the linear correction compensation value to the basic linear correction data table. The previous step of establish a basic linear correction data table may further include a step of Establishing a voltage variation compensation data table. This step compares the voltage variation with the voltage variation compensation data table to get a linear compensation value. The linear compensation value may be processed and fed back to update the basic linear correction data table to generate a new linear correction data table to become the constant potential depressing curve of the depressing electric field. Or the linear compensation value and the basic linear correction data table can be used as parameters of the depressing electric field at the same time and be input to the touch control system to perform cross process to get another constant potential depressing curve of a new depressing electric field.

Figure 2:
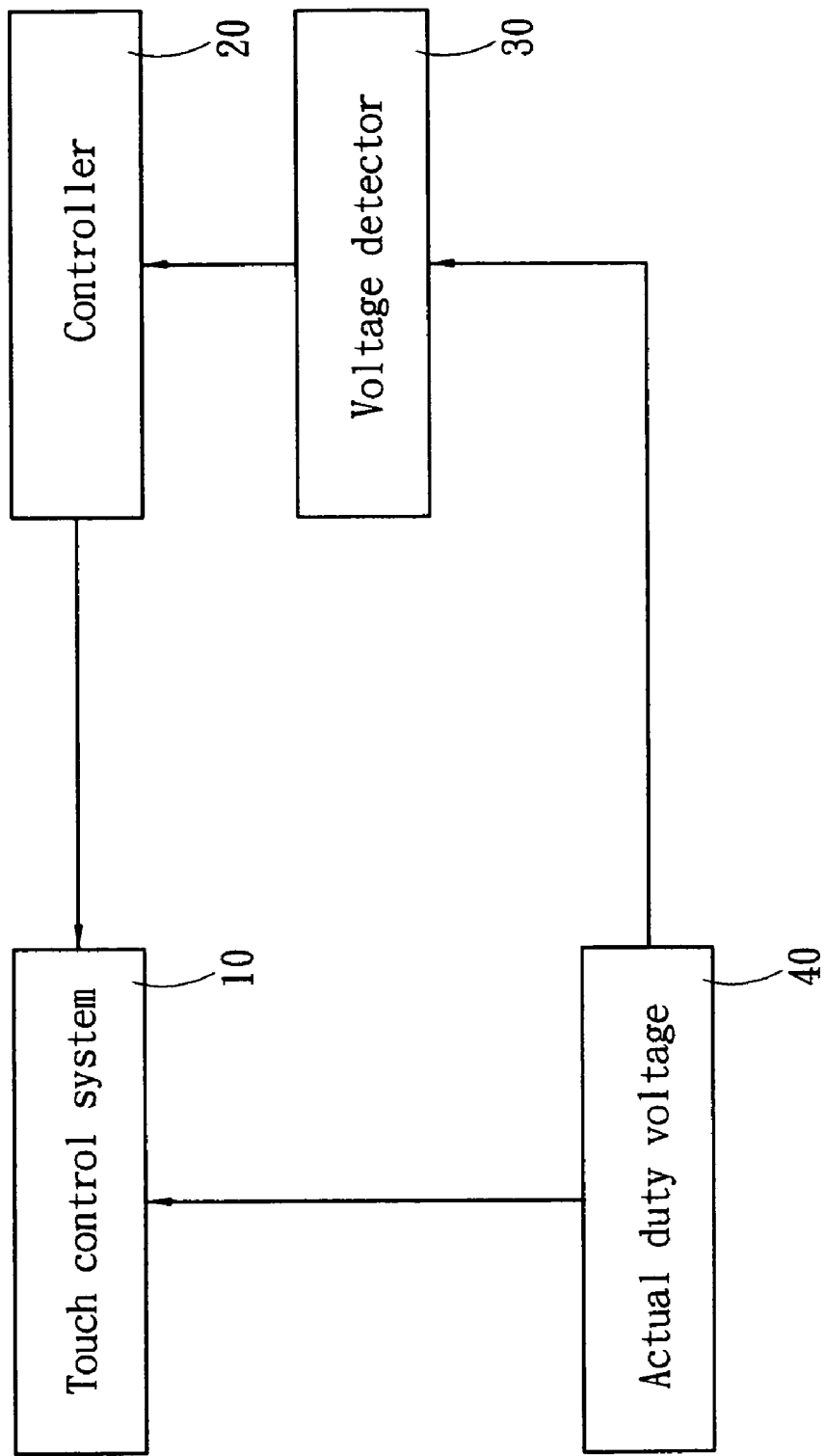
FIG. 2 is a block diagram of equipment for implementing the linear compensation method of the present invention.

Refer to FIG. 2 for equipment needed to implement the linear compensation method of the invention previously discussed. The equipment includes a controller 20 and a voltage detector 30. The equipment to implement the linear compensation method can be built in the touch control system 10 or externally connected to the touch control system 10. The voltage detector 30 aims to detect an actual duty voltage 40 input to the touch control system 10, and input the voltage variation between the actual duty voltage 40 and the rated duty voltage to the controller 20. The controller 20 stores the basic linear correction data table set up according to the rated duty voltage, and also establishes a voltage variation compensation data table, and provides process of the voltage variation to generate a linear correction compensation value. The process can be done by updating the basic linear correction data table to generate a new linear correction data table to become the constant potential depressing curve of a new depressing electric field, or treating the linear compensation value and the basic linear correction data table as the parameters of the depressing electric field to be input at the same time to the touch control system 10 to perform cross process to get the constant potential depressing curve of the new depressing electric field.

In short, the linear compensation method of the invention aims to compensate the linearity error of potential variation caused by voltage variation between the rated duty voltage and the actual duty voltage after shipment of a touch control system. Thus the accuracy of the depressing electric field of the touch control system can be enhanced to meet user's operation requirements.

Figure 3:
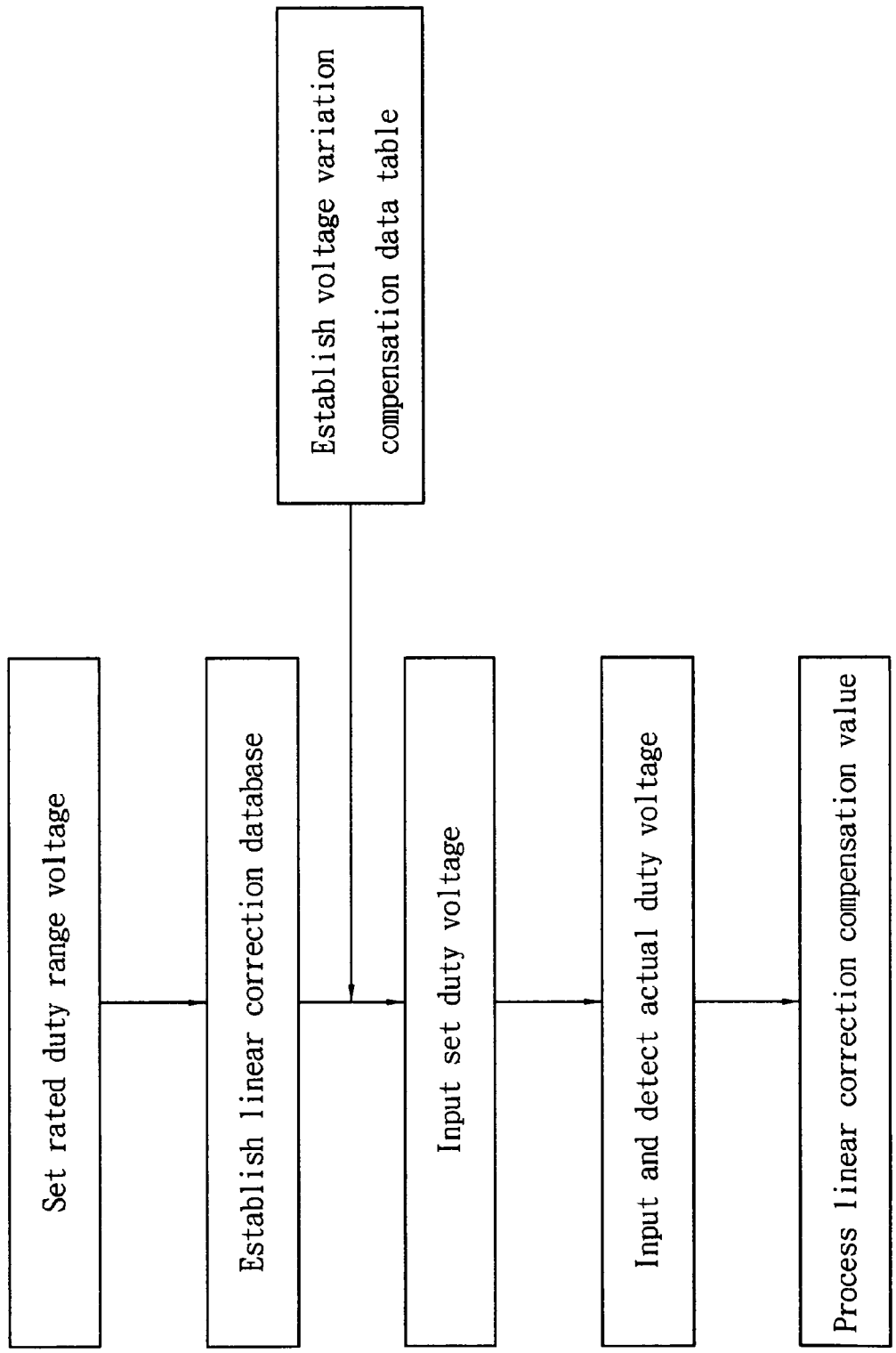
FIG. 3 is a flow chart of another embodiment of the linear compensation method of the present invention.

Refer to FIG. 3 for the flow chart of another embodiment of the linear compensation method of the invention. The method includes the following steps:

Set rated duty range voltage: Set a rated duty range voltage for a touch control system before shipping from the plant. As different operation environments have different potentials, different rated duty range voltages may be set according depressing electric fields during design and manufacturing of the touch control system.

Establish a linear correction database: Compare the rated duty range voltage with the linear correction value of the duty potential of the touch control system to set up a corresponding linear correction database conforming to the rated duty range voltage.

Input a set duty voltage: After the touch control system is finished and shipped, enter a set duty voltage to the touch control system to map the linear correction database to set up a basic linear correction data table. The set voltage is established corresponding to the potential of the operation environment where the touch control system is to be installed. The basic linear correction data table is for the constant potential depressing curve of the depressing electric field of the touch control system. Beside the linear correction data table, a voltage variation compensation data table may also be set up in advance.

Input and detect actual duty voltage: Input an actual duty voltage to the touch control system and detect and get voltage variation between the actual duty voltage and the rated duty voltage. In the event that the voltage variation between the actual duty voltage and the rated duty voltage is 0 or within an allowable error range, the touch control system takes the set basic linear correction data table as the constant potential depressing curve of the depressing electric field; in the event that the voltage variation is greater than 0 or exceeds the allowable error range, enter the next step.

Process a linear correction compensation value: Get a linear correction compensation value corresponding to the voltage variation. This step compares the voltage variation with the voltage variation compensation data table to get a linear compensation value. The linear compensation value is processed and fed back to update the basic linear correction data table to generate a new linear correction data table to become the constant potential depressing curve of the depressing electric field. Or the linear compensation value and the basic linear correction data table can be used as parameters of the depressing electric field at the same time and be input to the touch control system to perform cross process to get another constant potential depressing curve of a new depressing electric field.

The flow chart the another embodiment set forth above can also be implemented on the equipment depicted in FIG. 2. Hence the linear compensation method of the invention can compensate linearity error caused by potential variation resulting from voltage variation between the rated duty voltage and the actual duty voltage after shipment of the touch control system. The accuracy of the depressing electric field of the touch control system can be enhanced to meet user's operation requirements. In addition, the touch control system in this embodiment is allowed to be set within a rated voltage range during manufacturing. The set duty voltage can be used for initial linear correction compensation. This makes the depressing electric field of the touch control system more accurate.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A linear compensation method for touch control systems, comprising:
    setting a rated duty voltage for a touch control system;
    establishing a corresponding basic linear correction data table conforming to the rated duty voltage by defining the rated duty voltage as a duty potential of the touch control system;
    inputting an actual duty voltage to the touch control system and detecting and getting a voltage variation between the actual duty voltage and the rated duty voltage; and
    processing to get a corresponding linear correction compensation value through the voltage variation and reflecting the linear correction compensation value to the basic linear correction data table to correct linear correction data of the touch control system to conform to operating conditions of the actual duty voltage to maintain a desired accuracy thereof.

2. The linear compensation method of claim 1, wherein the step of establishing a corresponding basic linear correction data table further includes another step of establishing a voltage variation compensation data table.

3. The linear compensation method of claim 2, wherein the voltage variation compensation data table is used to feed back and update the basic linear correction data table.

4. The linear compensation method of claim 2, wherein the voltage variation compensation data table and the basic linear correction data table are input concurrently to the touch control system to perform cross processing and correction.

5. The linear compensation method of claim 1, wherein the linear compensation method is implemented through equipment which include:
   a controller to store the established basic linear correction data table for the rated duty voltage and provide voltage variation processing to generate the linear correction compensation value; and
   a voltage detector to detect and get the actual duty voltage input to the touch control system and input the actual duty voltage to the controller.

6. The linear compensation method of claim 5, wherein the controller contains a voltage variation compensation data table.

7. The linear compensation method of claim 6, wherein the controller processes and updates the basic linear correction data table by comparing the voltage variation with the voltage variation compensation data table.

8. The linear compensation method of claim 6, wherein the controller compares the voltage variation with the voltage variation compensation data table to link and process the basic linear correction data table and output the linear correction data.

9. A linear compensation method for touch control systems, comprising:
   setting a rated duty range voltage for a touch control system;
   establishing a corresponding linear correction database conforming to the rated duty range voltage by comparing the rated duty range with a linear correction value of a duty potential of the touch control system;
   inputting a set duty voltage to the touch control system and reflecting the set duty voltage to the linear correction database to establish a basic linear correction data table;
   inputting an actual duty voltage to the touch control system and detecting and getting a voltage variation between the actual duty voltage and the rated duty voltage; and
   processing to get a corresponding linear correction compensation value through the voltage variation and reflecting the linear correction compensation value to the basic linear correction data table to correct linear correction data of the touch control system to conform to operating conditions of the actual duty voltage to maintain a desired accuracy thereof.

10. The linear compensation method of claim 9, wherein the step of establishing a corresponding linear correction database further includes another step of establishing a voltage variation compensation data table.

11. The linear compensation method of claim 10, wherein the voltage variation compensation data table is used to feed back and update the basic linear correction data table.

12. The linear compensation method of claim 10, wherein the voltage variation compensation data table and the basic linear correction data table are input concurrently to the touch control system to perform cross processing and correction.

13. The linear compensation method of claim 9, wherein the linear compensation method is implemented through equipment which include:
   a controller to store the established basic linear correction data table for the rated duty range voltage and provide voltage variation processing to generate the linear correction compensation value; and
   a voltage detector to detect and get the actual duty voltage input to the touch control system, and input the actual duty voltage to the controller.

14. The linear compensation method of claim 13, wherein the controller contains a voltage variation compensation data table.

15. The linear compensation method of claim 14, wherein the controller processes and updates the basic linear correction data table by comparing the voltage variation with the voltage variation compensation data table.

16. The linear compensation method of claim 14, wherein the controller compares the voltage variation with the voltage variation compensation data table to link and process the basic linear correction data table and output the linear correction data.

* * * * *